June 16, 1942.   W. A. TRAUT   2,286,880
HYDRAULIC CONTROL SYSTEM
Filed July 5, 1940   4 Sheets-Sheet 1

INVENTOR
W. A. Traut
BY
Morsell, Lieber & Morsell
ATTORNEYS

June 16, 1942. W. A. TRAUT 2,286,880
HYDRAULIC CONTROL SYSTEM
Filed July 5, 1940 4 Sheets-Sheet 2

INVENTOR
W. A. Traut
BY
Morsell, Lieber & Morsell
ATTORNEYS.

June 16, 1942.  W. A. TRAUT  2,286,880
HYDRAULIC CONTROL SYSTEM
Filed July 5, 1940   4 Sheets-Sheet 3

INVENTOR
W. A. Traut
BY Morsell, Lieber & Morsell
ATTORNEYS

June 16, 1942.  W. A. TRAUT  2,286,880

HYDRAULIC CONTROL SYSTEM

Filed July 5, 1940  4 Sheets—Sheet 4

INVENTOR
W. A. Traut
BY
Morsell, Lieber & Morsell
ATTORNEYS.

Patented June 16, 1942

2,286,880

UNITED STATES PATENT OFFICE 2,286,880

HYDRAULIC CONTROL SYSTEM

William A. Traut, West Allis, Wis., assignor to Blackhawk Mfg. Co., Milwaukee, Wis., a corporation of Wisconsin Application July 5, 1940, Serial No. 344,097

16 Claims. (Cl. 60—52)

The present invention relates in general to improvements in the art of hydraulics, and relates more specifically to improvements in the construction and operation of hydraulic control systems for controlling the delivery of liquid from a pressure source to a pressure actuated device, and from the device back to the source.

An object of my invention is to provide an improved hydraulic control system which is relatively simple in construction, readily manipulable, and highly efficient in operation.

Many different types of hydraulic systems for controlling the delivery of liquid under pressure from a pressure source such as a pump to devices such as rams or jacks, and for releasing the pressure at the devices and returning the liquid to the source, have heretofore been proposed and used successfully in cases where the liquid was transferred and utilized at relatively low pressure. When high pressure was required, considerable difficulty has invariably been encountered in transferring the liquid at the desired pressure from the pump to the ram, in maintaining the pressure at the ram, and in releasing the pressure; and while the prior high pressure hydraulic control systems may have been able to meet certain rather specific conditions of operation, they were not sufficiently flexible and reliable to meet many other desirable operating conditions. Most of these prior high pressure hydraulic controls were difficult to actuate, were not entirely automatic in operation after being initially actuated, introduced excessive leakage and thus failed to maintain the desired pressures, were too complicated and therefore required considerable attention to maintain the same in operative condition, and were also insufficiently flexible to permit use thereof for diverse purposes.

It is therefore a more specific object of my invention to provide an improved high pressure hydraulic control system which obviates all of the objectionable features of prior controls of the high pressure type.

Another specific object of the invention is to provide a compact and reliable high pressure fluid system, which can be easily actuated, and wherein undesirable leakage is eliminated.

A further specific object of this invention is to provide an improved fluid pressure control system which is extremely flexible in its adaptations, and which can be used to control delivery of actuating fluid both to and from one or more high pressure zones, without subjecting the manually manipulable actuating mechanism to excessive pressure.

Still another specific object of the present invention is to provide a new and useful hydraulic control system especially adapted for high pressure fluid, wherein a pump of limited capacity may be utilized to perform work with maximum efficiency, especially in displacing the relatively movable elements of one or more single or double acting hydraulic jacks or rams.

An additional specific object of my present invention is to provide an improved hydraulic control assemblage which is highly efficient in use, and wherein relatively simple and easily machinable valve actuating parts and standard ball valves may be utilized to effectively control the flow of liquid under extremely high pressure.

Another additional object of the invention is to provide a high pressure hydraulic control mechanism which can be manufactured and sold at moderate cost, all parts of which are readily accessible for inspection and adjustment, and which can be utilized for many purposes.

These and other specific objects and advantages of my invention will be apparent from the following detailed description.

A clear conception of the specific construction and of the mode of operating my improved system in conjunction with several types of pressure utilizing devices, may be had by referring to the drawings accompanying and forming a part of this specification, wherein like reference characters designate the same or similar parts in the various views.

While the improved hydraulic control system has been shown herein more or less diagrammatically and as cooperating with a reciprocating pump constituting the high pressure source, and with a jack or ram constituting the work performable under high pressure, it is not my desire or intent to thereby unnecessarily limit or restrict the scope or utility of the invention which may be utilized for diverse other purposes.

Figures 1, 2:
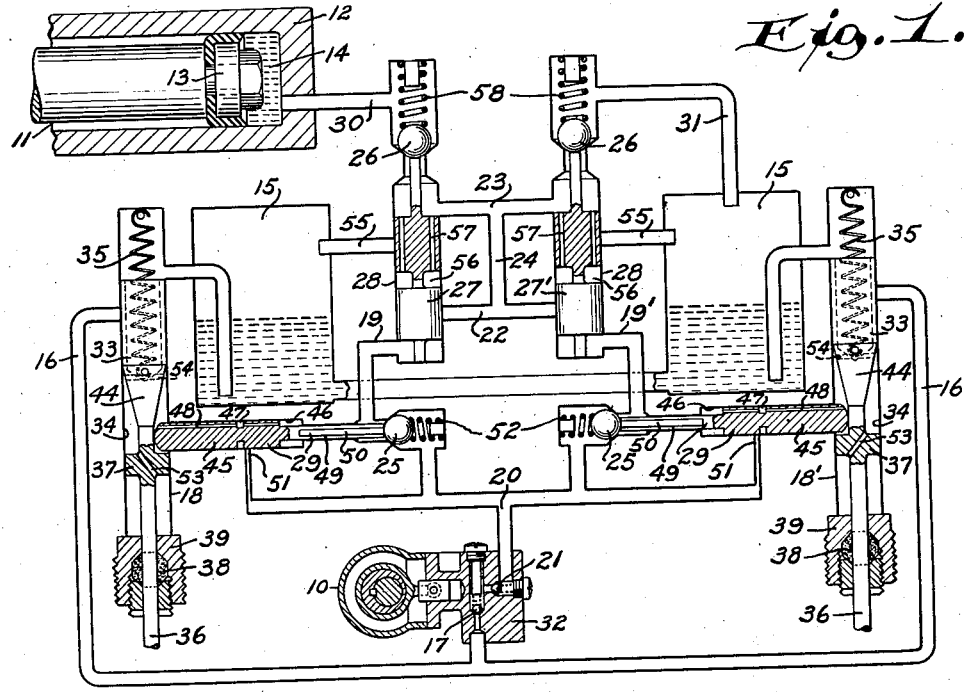
Fig. 1 is a diagram showing my improved hydraulic control system applied to one single acting jack or ram, with all valves closed and the mechanism inactive.
Fig. 2 is a similar diagram showing the system of Fig. 1 in action, with the pump operating and one of the manually operable selectors displaced to release high pressure liquid from the ram displacement chamber.
Figure 3:
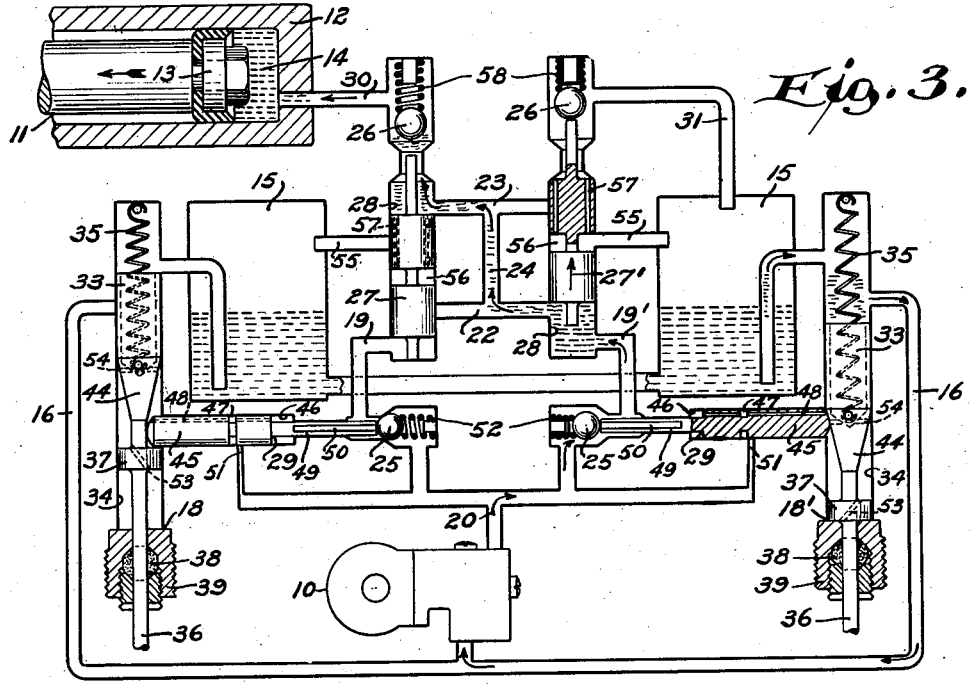
Fig. 3 is another similar diagram depicting the system of Fig. 1 in action, with the pump still operating and the other selector displaced to admit hydraulic pressure to the ram displacement chamber.

Referring to the diagrams of Figs. 1, 2 and 3, the improved high pressure control system shown therein, comprises in general, a liquid pressure source or reciprocating single acting pump 10; a high pressure liquid operable device or single acting hydraulic ram 11 having a cylinder 12, a piston 13 reciprocable in the cylinder 12, and a displacement chamber 14 interposed between the cylinder and piston; a two-part reservoir 15 adapted to receive liquid discharged from the ram 11, and to also receive excess liquid discharged by the pump 10; means forming a pair of suction or inlet conduits 16 leading from the two sections of the reservoir 15 to the pump suction valve 17; a pair of similar manually operable selector mechanisms 18, 18' interposed, one in each of the suction conduits 16; means forming a pair of similar high pressure liquid discharge conduits 19, 19' connected at their inlet ends to a common passage 20 leading to the pump discharge valve 21, and interconnected intermediate their ends by ports 22, 23 which are connected to each other by a duct 24; a pair of oppositely seating valves 25, 26 preferably of the ball type disposed within each of the conduits 19, 19', and of which the valves 25 are subjected directly to the pump discharge pressure, while the valves 26 are seatable by spring pressure but are adapted to be unseated by liquid pressure operable pistons 27, 27' movable in bores 28 constituting parts of the conduits 19, 19'; reciprocable members or rods 29 formed either in one or two sections and being operable by the selectors 18, 18' to unseat the valves 25 against the liquid and spring pressures acting thereon; a conduit 30 connecting the conduit 19 beyond the valve 26 therein with the ram displacement chamber 14; and another conduit 31 connecting the conduit 19' beyond the valve 26 therein with the reservoir 15.

Figure 8:
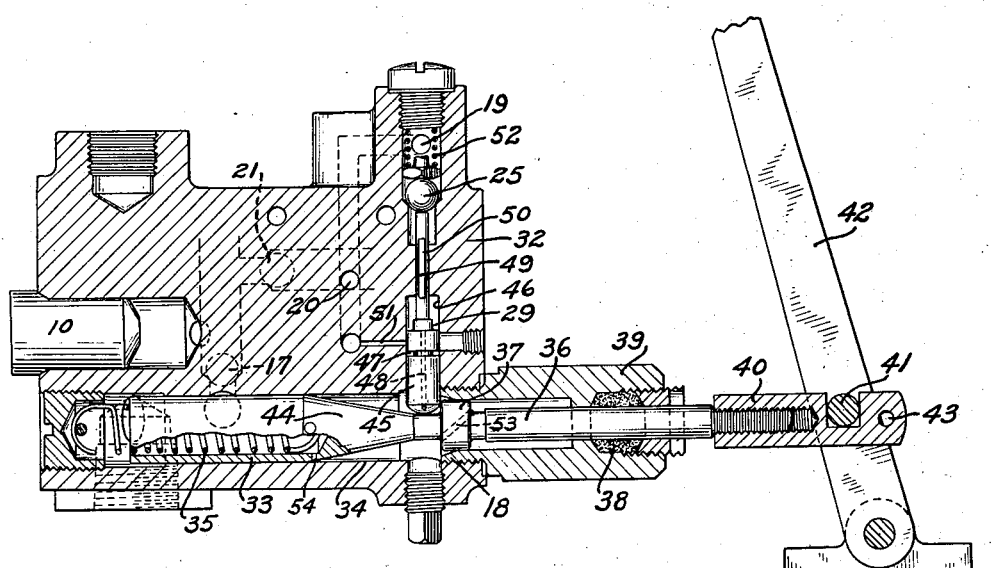
Fig. 8 is a somewhat enlarged longitudinal central section through one of the improved manually manipulable selector mechanisms.

While various elements of the improved control system have been shown diagrammatically in Figs. 1, 2 and 3, for the sake of clearness, many of these elements may be housed directly within a common casing 32 as illustrated in Fig. 8, wherein one of the manually operable selectors 18 is shown more in detail. Each of the selectors 18, 18', comprises a piston 33 slidable in a bore 34 in the casing 32, and normally adapted to cut-off communication between the adjacent pump suction conduit 16 and the reservoir 15, when the piston 33 is in neutral position as in Fig. 1, so as to prevent liquid from flowing to the pump. The piston 33 of each selector 18, 18' is constantly urged toward neutral position by a tension spring 35, and has an internal actuating stem 36 provided with a guide member 37 and extending outwardly through a packing 38 carried by a closure fitting 39 for the adjacent bore 34. The outer end of each selector actuating stem 36 is provided with a head 40 having a side notch cooperable with a pin 41 carried by an actuating lever 42, and the head 40 may also be provided with a hole 43 adapted for attachment of a remote control cable. The medial portion of each piston 33 has a conical or tapered portion 44 which is adapted to coact with the extreme end of the adjacent valve actuating rod 29, and each of these rods has an enlarged portion 45 snugly fitting and slidable in a bore 46 and provided with an annular groove 47 and small through passages 48, and also has a reduced portion 49 also snugly fitting its guide bore and directly cooperable with the adjacent valve 25 and being provided with a flat 50. The annular piston groove 47 is registerable with a port 51 communicating with the pump discharge passage 20, only momentarily when the corresponding rod 29 is shifted from one extreme position to the other, and serves to release high pressure liquid from the discharge passage 20 when the adjacent rod 29 is moving from its valve 25. The flat 50 on each rod portion 49 is of such length that it will establish communication between the adjacent conduit 19, 19' and bore 46 only when the corresponding valve 25 is closed, and these flats 50 serve to release liquid pressure from the portions of the conduits 19, 19' beneath the pistons 27, 27' when these pistons are in lowermost position. The ball valves 25 are urged toward closed position by springs 52, and the guide member 37 of each selector 18, 18' has an opening 53 therethrough for equalizing the pressures thereon, while each piston 33 is provided with drain holes 54 permitting escape of liquid to the conduits 16 or to the reservoir 15. It is to be noted, that the flats 50, passages 48, grooves 47, and ports 51 are of relatively small cross-sectional area, and that these ducts are so formed and positioned that they will quickly and effectively prevent hydraulic locking of the movable elements of the system. Whenever a selector 18, 18' is returned to neutral or normal position, the pump suction line 16 will be disconnected from the reservoir 15, and the pump will not deliver liquid under pressure to the discharge line 20, and since the suction is cut-off before the corresponding rod 29 can return to neutral, the residual liquid under pressure in the line 20 will escape to the reservoir 15 through the port 51 as the groove 47 moves past this port. When the rod has returned to normal, liquid under pressure trapped in the conduit 19, 19' beneath the piston 27, 27', will also escape to the reservoir 15 through the flat 50, passage 48, groove 47, bore 34, and port 54.

Each of the conduit bores 28 besides communicating with the adjacent valves 25, 26 and with each other through the ports 22, 23, has a liquid discharge duct 55 leading to the supply reservoir 15, and each piston 27, 27' is provided with a medial groove 56 and with passages 57 connecting the groove 56 with the adjacent ball valve 26. The grooves 56 are adapted to register with the adjacent passages 55 when the corresponding pistons 27, 27' are active in opening the valves 26, and these valves besides being urged to closing position by liquid pressure from the pressure utilizing devices, are forced toward their seats by compression springs 58. The pistons 27, 27', are not only adapted to control the flow of liquid through the passages 57, but also control the passage of liquid under high pressure through the ports 22, 23 and through the duct 24, so that these pistons should have snug coaction with the conduit bores 28.

During normal use of the system when applied to a single acting ram 11 as in Figs. 1, 2 and 3, the apparatus when in neutral position, has its various elements positioned as illustrated in Fig. 1, with all of the valves 25, 26 seated, the pump delivery line 20 shut-off by the valves 25 and rods 29, and the selectors 18, 18' positioned so as to close communication between the suction conduits 16 and the reservoir 15. The displacement chamber 14 of the ram 11 may contain some liquid, which is not, however, necessarily under pressure, but the valve 26 in the conduit 19 will be held closed by its spring 58, and the valve 26 in the conduit 19' will be seated by its spring 58.

When the selector 18 is moved into the position shown in Fig. 2, the pump suction line 16 will be placed in communication with the reservoir 15 and liquid under pressure will be delivered by the pump 10 through the passage 20, and past the valve 25 in the conduit 19, into the displacement chamber at the end of the corresponding piston 27. The admission of high pressure liquid to the conduit 19 will displace the piston 27 therein and will cause this piston to unseat the corresponding ball valve 26, thereby permitting liquid to escape from the ram displacement chamber 14 through the conduit 30, passages 57 and duct 55, to the reservoir 15, thereby permitting the piston of the ram 11 to move toward the right as shown in Fig. 2. The liquid under pressure delivered from the pump after elevating the piston 27 in the conduit 19, passes through the port 22, duct 24 and port 23, into the conduit 19' and elevates the other valve 26, thereby permitting the excess liquid under pressure to escape through the conduit 31 to the reservoir 15. This condition will prevail so long as the selector 18 is retained in the position shown in Fig. 2, and when the actuating lever 42 for the selector 18 is released, the corresponding spring 35 will promptly return the adjacent piston 33 to neutral position as shown in Fig. 1, thereby interrupting the delivery of liquid to and from the pump 10. The corresponding passages 48, grooves 47, flats 50 and ports 51 will then become quickly effective to relieve the liquid pressure from the conduit 19 and discharge line 20.

When the other selector 18' is manipulated and positioned as shown in Fig. 3, while the pump 10 is operating, the valve 25 in the conduit 19' will be unseated, thereby permitting the pump to draw liquid from the reservoir 15 and allowing liquid under pressure to flow from the pump discharge pipe 20 past the unseated valve 25, and into the conduit 19'; thus moving the piston 27' and causing this piston to positively open the corresponding valve 26. Delivery of liquid through the conduit 31 and through the duct 55 which communicate with the conduit 19', is then positively cut off, and high pressure liquid flows through the port 22, duct 24 and port 23, into the conduit 19, and unseats the valve 26 nearest to the ram. As this valve is unseated, liquid under high pressure flows through the conduit 30 and into the displacement chamber 14 of the ram 11, thereby causing the piston 13 to move toward the left as viewed in Fig. 3. This movement of the ram piston 13 will continue so long as the pump 10 continues to operate and until the motion is positively arrested, and when the operating lever 42 of the selector 18' is released, the assemblage will again assume neutral position as shown in Fig. 1.

It is to be noted that the pump 10 should be provided with the usual relief valve for permitting excess liquid to escape to the reservoir 15 when the various elements of the system and of the ram 11 have been positively stopped. After each return of the system to neutral position, the various passages 48, grooves 47 and flats 50 will permit liquid under pressure to escape from the conduits 19, 19' so that the system cannot become pressure bound or hydraulically locked, and will always be ready for immediate subsequent operation. It is also to be noted that when either of the selectors 18, 18' is manipulated, the subsequent functioning of the system is entirely automatic; and while the pump 10 may be operating constantly or may be started whenever a selector 18, 18' is manipulated, it cannot deliver liquid under pressure to the discharge line 20 unless one of the selectors is shifted, because these selectors cut-off the suction or supply line when they are in neutral position.

Figure 4:
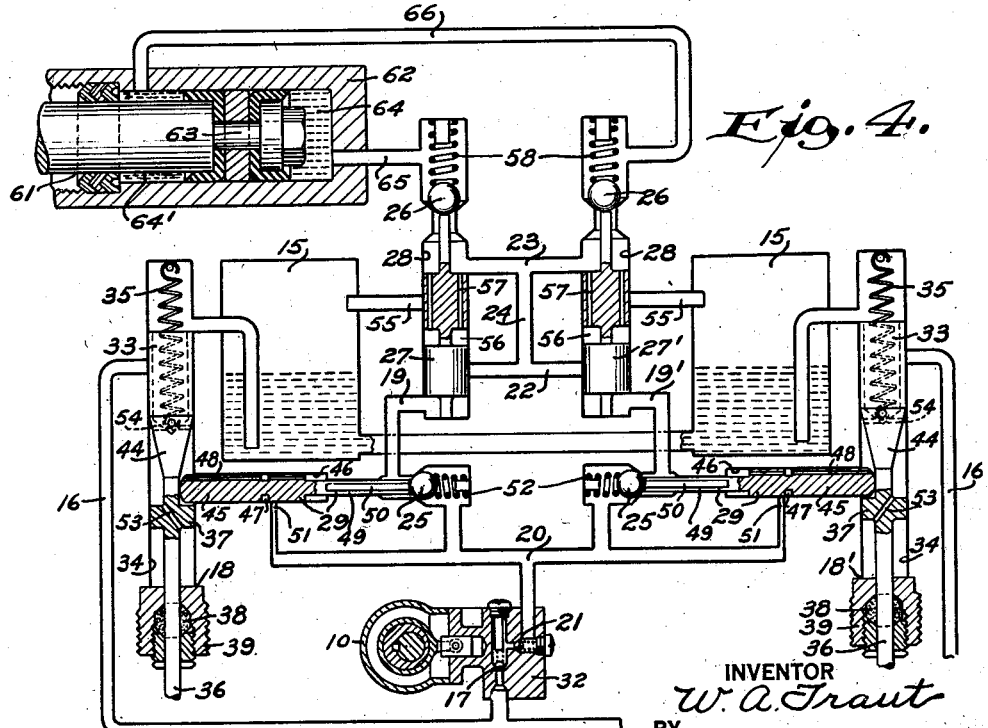
Fig. 4 is a diagram showing the improved hydraulic control system applied to one double acting jack or ram, with all valves closed and the mechanism in neutral position.
Figure 5:
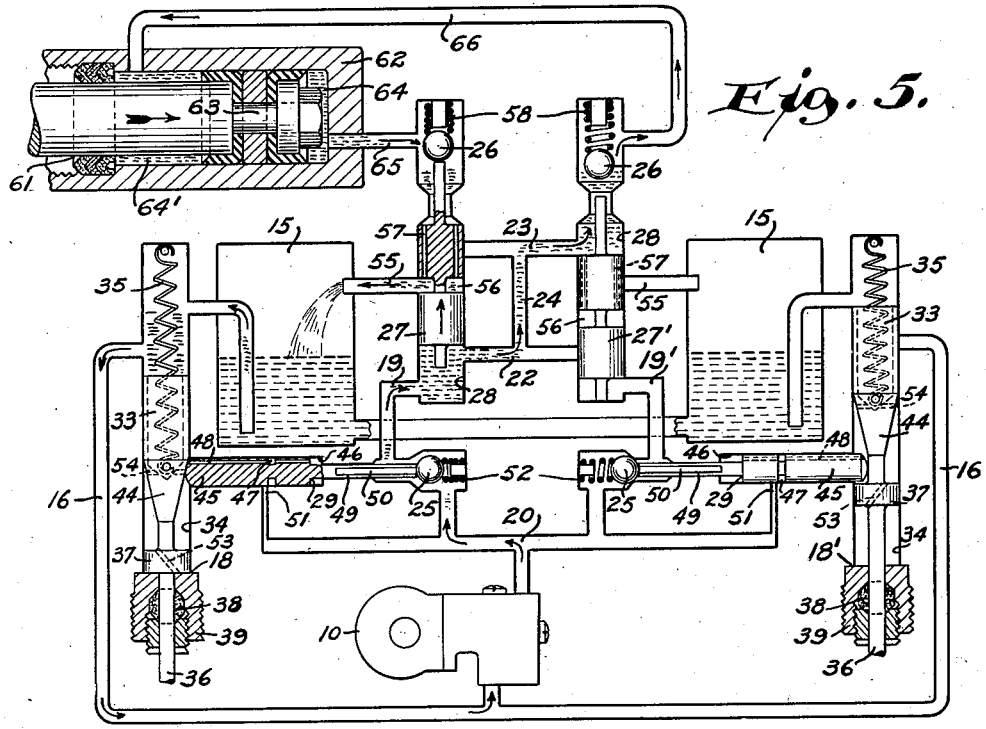
Fig. 5 is a diagram similar to that of Fig. 4, but illustrating the system in action with the pump operating and one of the manual selectors shifted to release pressure liquid from one displacement chamber while admitting high pressure liquid to the other.
Figure 6:
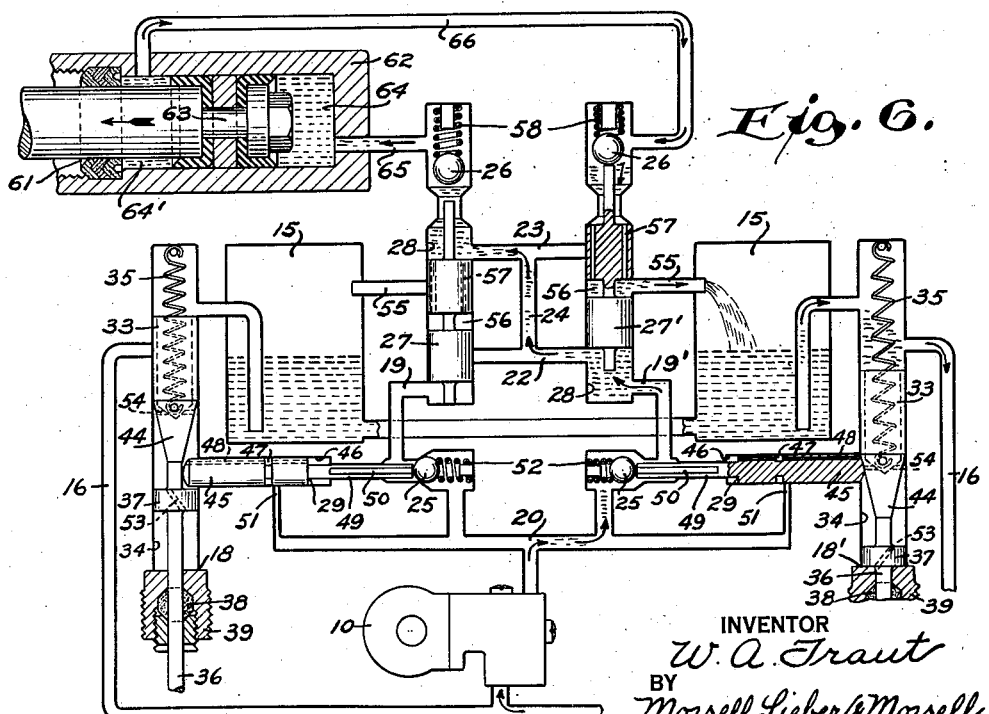
Fig. 6 is another diagram similar to that of Figs. 4 and 5, again showing the system in action but with the other selector shifted so as to reverse the jack action.

Referring more particularly to the diagrams of Figs. 4, 5 and 6, the improved high pressure hydraulic control system shown therein, is identical with that of Figs. 1, 2 and 3, but coacts with a double acting jack or ram 61. This double acting ram 61 has a cylinder 62, a piston or plunger 63 reciprocable within the bore of the cylinder 62, and displacement chambers 64, 64' in the cylinder 62 on opposite sides of the plunger 63. The displacement chamber 64 is connected to the conduit 19 beyond the piston 27 and the ball valve 26 therein, by means of a conduit 65; and the other displacement chamber 64' is likewise connected to the other conduit 19' beyond the piston 27' and ball valve 26 therein, by means of another conduit 66. It will thus be noted that while the conduit 65 is similar to the conduit 30 of Fig. 1, the conduit 66 replaces the conduit 31 and there is no connection from the conduit 19' beyond the valve 26 therein, directly to the reservoir 15. Aside from these specific differences, the assemblage of Figs. 4, 5 and 6 may be the same as that of Figs. 1, 2 and 3, and the selectors 18, 18' may be constructed as shown in detail in Fig. 8.

During normal use of the improved system when applied to a double acting ram 61 as in Figs. 4, 5 and 6, the apparatus when in neutral position, has its various parts positioned as illustrated in Fig. 4, with all of the valves 25, 26 closed the pump 10 inactive, and the selectors 18, 18' positioned so as to close communication between the suction conduits 16 and the reservoir 15. The displacement chambers 64, 64' of the double acting ram 61 may contain liquid, which may or may not be under pressure, but in any event, the valves 26 in the conduit 19, 19' will be maintained in closed position by the springs 58, and the valves 25 will be maintained closed by the springs.

When the pump 10 is connected to the reservoir 15 and becomes active, by movement of the selector 18 into the position shown in Fig. 5, liquid under pressure will be delivered from the pump through the passage 20, and past the valve 25 in the conduit 19, into the displacement chamber at the end of the corresponding piston 27. The admission of high pressure liquid to the conduit 19 will displace the piston 27 therein and will cause this piston to unseat the corresponding ball valve 26, thereby permitting liquid to escape from the ram displacement chamber 64 through the conduit 65, passages 57 and duct 55, to the reservoir 15 as shown in Fig. 5, thus permitting the piston 63 of the ram 61 to move toward the right. Simultaneously with this release of pressure from the ram displacement chamber 64, the liquid under pressure discharged from the pump 10, after elevating the piston 27 in the conduit 19, flows through the port 22, duct 24 and port 23, into the conduit 19' where it lifts the other valve 26 from its seat, thereby permitting the high pressure liquid to flow through the pipe 66 and into the other displacement chamber 64' of the ram 61. This admission of high pressure liquid to the displacement chamber 64' and release of pressure from the other displacement chamber 64, positively moves the piston 63 toward the right, and this movement will continue so long as the selector 18 is retained in the position shown in Fig. 5. When the actuating lever 42 for the selector 18 is released, the corresponding spring 35 will promptly return the piston 33 of this selector to neutral position as shown in Fig. 4, thereby cutting off the delivery of liquid from the pump 10.

When the other selector 18' is manipulated and positioned as shown in Fig. 6, during normal operation of the pump 10, the valve 25 in the conduit 19' will be unseated, thereby permitting liquid under pressure to flow from the pump discharge pipe 20 past the unseated valve 25, and into the conduit 19' thus moving the piston 27' to a position wherein the corresponding valve 26 is positively opened. Delivery of liquid through the conduit 66 will then be cut off and the ram displacement chamber 64' will be connected to the reservoir 15 through the conduit 66, passages 57, recess 56 and duct 55, thereby permitting the piston 63 to move toward the left. The lifting of the piston 27' simultaneously permits high pressure liquid to flow through the port 22, duct 24, and port 23 into the conduit 19, and to unseat the other valve 26 so that high pressure liquid will then be free to flow through the conduit 65 and into the other displacement chamber 64. This admission of high pressure liquid to the displacement chamber 64, and release of the pressure from the displacement chamber 64', causes the piston 63 to move toward the left as viewed in Fig. 6, and this movement of the ram piston will continue as long as the pump 10 continues to operate and until the motion of the ram piston is positively arrested. When the operating lever for the selector 18' is released, the spring 35 will return this selector to neutral position as shown in Fig. 4, thereby arresting the movement of the ram piston.

Figure 7:
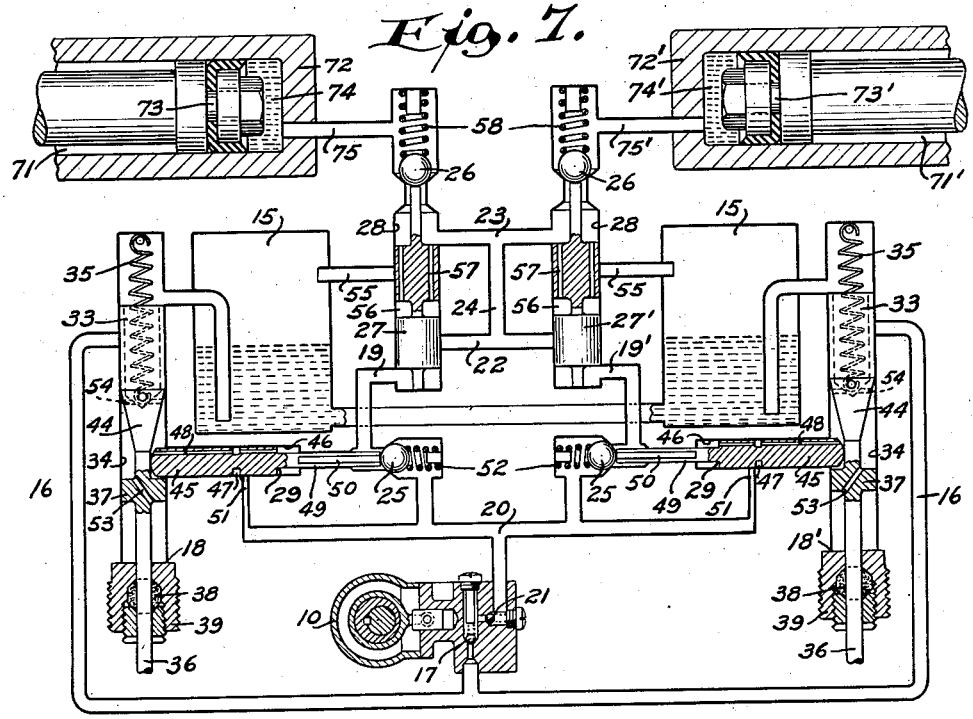
Fig. 7 is still another similar diagram illustrating the improved hydraulic control system applied to two single acting but oppositely moving hydraulic jacks or rams, and showing the mechanism in neutral or inactive position.

Referring specifically to the modified assemblage of Fig. 7, the selector and control mechanisms are again the same as previously described, but the improved hydraulic system is caused to cooperate with two single acting jacks or rams 71, 71', instead of with one single acting ram 11 as in Fig. 1, or one double acting ram 61 as in Fig. 4. The single acting ram 71 comprises a cylinder 72 having a piston 73 coacting with the cylinder bore and subjected to a displacement chamber 74, and the other single acting ram 71' comprises a cylinder 72' having therein a piston 73' subjected to a displacement chamber 74'. The displacement chamber 74 is connected by a conduit 75 to the conduit 19 beyond the ball valve 26 therein, and the other displacement chamber 74' is connected by another conduit 75' to the conduit 19' beyond the valve 26 therein. Aside from these differences, the assemblage of Fig. 7 is the same as that of Figs. 1 and 4, and again utilizes selectors 18, 18' similar to that shown in detail in Fig. 8.

During normal operation of the modified hydraulic system of Fig. 7, the selectors 18, 18' may again be manipulated at the will of the operator, to move the pistons 73, 73' in the desired directions. If the selector 18 is manipulated, liquid will be released from the displacement chamber 74 of the ram 71 to the reservoir 15 through the conduit 75, duct 57, groove 56, and port 55, and liquid under high pressure will be simultaneously admitted from the pump 10 through the conduits 19, ports 22, 24, 23, past the right valve 26, and conduit 75' to the displacement chamber 74' of the other ram 71', thereby causing both of the pistons 73, 73' to simultaneously move toward the right as viewed in Fig. 7. If the other selector 18' is manipulated, liquid will be released from the displacement chamber 74' of the ram 71' to the reservoir 15 through the conduit 75' duct 57, groove 56 and port 55, and liquid under high pressure will be simultaneously admitted from the pump 10 through the conduits 19', ports 22, 24, 23, past the left valve 26 and conduit 75 to the displacement chamber 74 of the other ram 71 to thereby cause both ram pistons 73, 73' to simultaneously move toward the left as viewed in Fig. 7. In this manner the two rams 71, 71' can be alternately actuated in opposite directions, and when the selectors 18, 18' are released and return to neutral position, the pistons 27, 27' will return to neutral position and the valves 25, 26 will close. The pressure from within this hydraulic system will again be automatically relieved as previously described, by the passages 48, grooves 47, flats 50, and ports 51, so as to prevent hydraulic locking.

From the foregoing detailed description it will be apparent that my present improvement provides an improved system for controlling the flow of liquid under high pressure from a pressure source such as a pump 10, to and from a liquid operable device such as one or more rams 11, 61, 71, and comprising primarily a pair of conduits connecting the pressure source with the device and oppositely seating valves in each conduit between which pressure operated pistons 27, 27' are disposed, these pistons being operable when the valves which are exposed to the pressure source are unseated. The improved system is especially adapted for operation under high liquid pressure and the improved selectors are not subject to undesirably high pressures and are therefore conveniently operable at all times, because the high liquid pressure in the system is automatically released whenever the selectors are returned to normal. The two independent selectors which are provided in the improved system, permit rapid delivery of pressure to, and release of pressure from the pressure actuated devices, and the various ports 51, 53, 54, 57 and passages 47, 48, 50 formed in the pistons 27, 27', on the rods 29, and otherwise provided, are extremely important as they positively prevent hydraulic locking of the system. When the system is in neutral position, there is no pressure acting upon the rods 29 tending to oppose the movement of the selectors 18, 18', since it is impossible for the pump 10 to withdraw liquid from the reservoir 15 and to create pressure until after one of the selectors has been actuated. When single acting rams 11, 71, 71' are utilized, the pistons may be moved in opposition to the pressure in the displacement chamber, with the usual springs or otherwise, and the improved control system obviously possesses sufficient flexibility to permit its use in conjunction with either one single acting ram 11, one double acting ram 61, or two single acting rams 71. By duplicating the improved system, any number of either single acting or double acting rams may be controlled by any desirable number of selectors 18, 18', and the various conduits, passages, pistons, and valves may be readily confined within compact casings 32 such as shown in Fig. 8. Any suitable control for starting the high pressure pump 10 when a selector lever 42 is operated, may be utilized, and the pump 10 may also be replaced by any other suitable source of liquid under high pressure, while the pressure operated devices may assume various forms. The system is furthermore adapted for remote control, by virtue of the fact that selectors 18, 18' are not subject to excessive pressure resisting the normal operation thereof, and the selector casings 32 may be readily machined and duplicated with the aid of jigs and are provided with removable plugs and other closures so as to permit convenient access to the valves, pistons, rods, springs, and other parts of the system.

Aside from the extreme flexibility in adaptation of the present system to rams and pressure operated devices of various types, the system is especially adapted for operation under high pressure by virtue of the use of primary and secondary ball valves 25, 26 respectively, for preventing escape of liquid under pressure. These ball valves are capable of tight closure, and the pistons 27, 27' should be rather snugly fitted within the bores 28 in order to avoid excessive leakage. The pistons 33 may be rather freely movable within the bores 34, since they do not seal against high pressure, and the rod portions 45, 49 should preferably be fitted rather snugly within their bores, since these rod portions are subject to high pressure. Although the reservoir 15 has been shown as being formed of two sections, this disclosure has ben made merely for the purpose of clearness in illustration, and in actual practice only one reservoir is required. The invention has proven highly successful in actual use, and besides being extremely efficient in operation when subjected to liquid under high pressure, the system is also foolproof against hydraulic locking and can be utilized for diverse purposes.

It should be understood that it is not desired to limit this invention to the exact details of construction, or to the precise mode of use, herein shown and described, for various modifications within the scope of the claims may occur to persons skilled in the art.

I claim:

1. A system for controlling the flow of liquid to and from several liquid operable devices, said system comprising, a liquid supply reservoir, a pump, means forming a conduit connecting said pump with said devices, a valve in said conduit movable during closing away from said pump, a second valve in said conduit movable during closing away from one of said devices, a manually actuable selector operable to open said first-mentioned valve and to connect the pump inlet to said reservoir, and a pressure actuated plunger operable by liquid under pressure passing said first valve to cause said liquid to open said second valve and thereby permit liquid under pressure to flow freely from said pump to said device, said plunger being formed to permit other liquid to enter said reservoir from another of said devices.

2. A system for controlling the flow of liquid from a pressure source to and from a liquid operable device, said system comprising, means forming two interconnected conduits connecting said pressure source with said device, an independent valve in each of said conduits seatable in a direction away from said source, a second independent valve in each of said conduits seatable in a direction opposite to the direction of seating of the corresponding first-mentioned valve in said conduit, a selector for unseating each of said first-mentioned valves, and a piston movable in each of said conduits by liquid under pressure passing said first-mentioned valve in the conduit for causing liquid under high pressure to open the second valve in the other of said conduits.

3. A system for controlling the flow of liquid from a liquid operable device, said system comprising, means forming two conduits communicable with said device and each having therein oppositely seating primary and secondary valves disposed at its opposite ends, an element movable in each of said conduits by liquid under pressure passing the corresponding primary valve to open the corresponding secondary valve and having liquid exhaust passages communicating with said secondary valve, a selector for opening each of said primary valves, and a liquid passage connecting each of said conduits on one side of the movable element therein with the other conduit on the other side of the movable element therein.

4. A system for controlling the flow of liquid from a pressure source to and from a liquid operable device, said system comprising, a conduit connecting said source and said device, primary and secondary valves seating toward the opposite ends of said conduit, an element movable in said conduit by liquid passing said primary valve to unseat said secondary valve, said element having an exhaust port therein, means cooperable with said element port when the element is moved for connecting said secondary valve to exhaust, means for opening said primary valve to admit liquid under pressure from the source to said element, and means for admitting liquid under pressure from the source to the device past said secondary valve when said primary valve is closed.

5. A system for controlling the flow of liquid, said system comprising, a liquid supply reservoir, a pump, a conduit having a valve therein normally exposed to the discharge line of said pump, a member movable to unseat said valve and having a restricted passage therein for relieving the pressure in said conduit when said valve is closed, and a selector operable to move said member to unseat said valve and to simultaneously connect the suction line of said pump to said reservoir.

6. A system for controlling the flow of high pressure liquid from a pressure source to a liquid actuated device, said system comprising, a conduit connecting said source and said device and having a ball valve therein normally seated by pressure from said source, a member movable to open said valve and having passages therein for relieving the pressure in said conduit when said valve is closed, and a selector for moving said member and for admitting liquid to the pressure source.

7. A system for controlling the flow of high pressure liquid from a pressure source to a liquid actuated device, said system comprising, a conduit connecting said source and said device and having a ball valve therein, a rod member movable longitudinally to unseat said valve, a casing having a bore extending across the end of said rod member, and a manually movable piston slidable in said bore and having a tapered portion for moving said rod member to unseat said valve, said piston being formed to control the delivery of liquid to said source.

8. In a hydraulic pressure control system, a pressure source, a liquid supply reservoir for said source, a device operable by liquid under pressure from said source, a conduit connecting said source and said device and having primary and secondary oppositely seating valves therein, means for selectively operating said primary valve, a member movable by liquid under pressure passing said primary valve to unseat said secondary valve, conduit means for returning liquid from said device to said reservoir and being controllable by said member, and other valve means for admitting liquid from said source to said device past said secondary valve when said primary valve is closed.

9. In a hydraulic pressure control system, a pressure source, a liquid supply reservoir for said source, a device operable by liquid under pressure from said source, a conduit connecting said source and said device and having a valve therein, a selector for opening said valve and for connecting said source to said reservoir, and means interposed between said selector and said valve for releasing the pressure on both sides of said valve when said selector is in neutral position.

10. In a hydraulic system, a pump, a liquid supply reservoir, a device operable by liquid under pressure from said pump, a conduit connecting said pump and said device and having a ball valve therein, a selector for opening said valve and for connecting the suction side of said pump with said reservoir, and means for relieving the discharge side of said pump and said valve from hydraulic pressure when said selector is inactive.

11. In a hydraulic system, a pump, a liquid supply reservoir, a device operable by liquid under pressure from said pump, a conduit connecting said pump and said device and having a ball valve therein, a selector for opening said valve and for connecting the suction side of said pump with said reservoir, and means for simultaneously relieving the discharge side of said pump and said conduit on opposite sides of said valve from hydraulic pressure when said selector is inactive.

12. A system for controlling the flow of liquid from a pressure source to and from a liquid operable device, said system comprising, a conduit connecting the source and the device, primary and secondary valves at the opposite ends of said conduit and seating toward each other, an element movable in said conduit by liquid passing said primary valve to unseat said secondary valve, means operable by said movable element to connect said secondary valve to exhaust, means for opening said primary valve to admit liquid under pressure from said source to said movable element, and means for admitting liquid under pressure from the source to the device past said secondary valve when said primary valve is closed.

13. A system for controlling the flow of liquid from a pressure source to and from a pair of liquid operable devices, said system comprising, means forming two conduits connecting the source with the devices and each having therein a primary and a secondary valve, means movable in each of said conduits by liquid under pressure passing the primary valve therein for unseating the secondary valve therein, said means being formed to co-operate with the corresponding secondary valve when unseated to exhaust liquid from the corresponding device, a connection between said conduits and being co-operable with said movable means to admit liquid under pressure to the device which is not exhausting, and means for selectively operating said primary valves.

14. A system for controlling the flow of liquid from a pressure source to and from a pair of liquid chambers, said system comprising, means forming two conduits connecting the source with the chambers and each having therein a primary and a secondary valve, a piston valve movable by liquid under pressure passing the primary valve in each of said conduits for unseating the secondary valve in the same conduit, said piston valves being formed to co-operate with the corresponding secondary valve when unseated to exhaust liquid from the corresponding chamber, passages connecting said conduits and being co-operable with said piston valves to admit liquid under pressure to the chamber which is not exhausting, and means for selectively operating said primary valves.

15. A system for controlling the flow of liquid from a pressure source to a liquid operable device from a liquid supply, said system comprising, means forming two conduits connecting the source with the device and supply respectively, a primary valve in each conduit near said source, a secondary valve in each conduit near said device and supply respectively, a third valve in each conduit movable by liquid under pressure passing the primary valve therein for unseating the secondary valve therein, passages connecting said conduits at said third valves, said third valve in the conduit communicating with said device being formed to exhaust liquid from said device when the secondary valve is unseated thereby and said third valve in the conduit communicating with said supply being formed to simultaneously permit liquid under pressure from said source to return to said supply past the secondary valve in said latter conduit when said device is exhausting, and means for selectively opening said primary valves.

16. A system for controlling the flow of liquid from a pressure source to a liquid operable device from a liquid supply, said system comprising, means forming two conduits connecting the source with the device and supply respectively, a primary valve in each conduit near said source, a secondary valve in each conduit near said device and supply respectively, a third valve in each conduit movable by liquid under pressure passing the primary valve therein for unseating the secondary valve therein, passages connecting said conduits at said third valves, said third valve in the conduit communicating with said supply being formed to deliver liquid from said source past the secondary valve in the other conduit to said device when the secondary valve in said first mentioned conduit is unseated by the third valve therein and the third valve in the conduit communicating with said device being formed to remain inactive during delivery of liquid to said device, and means for selectively opening said primary valves.

WILLIAM A. TRAUT